United States Patent Office 2,858,700
Patented Nov. 4, 1958

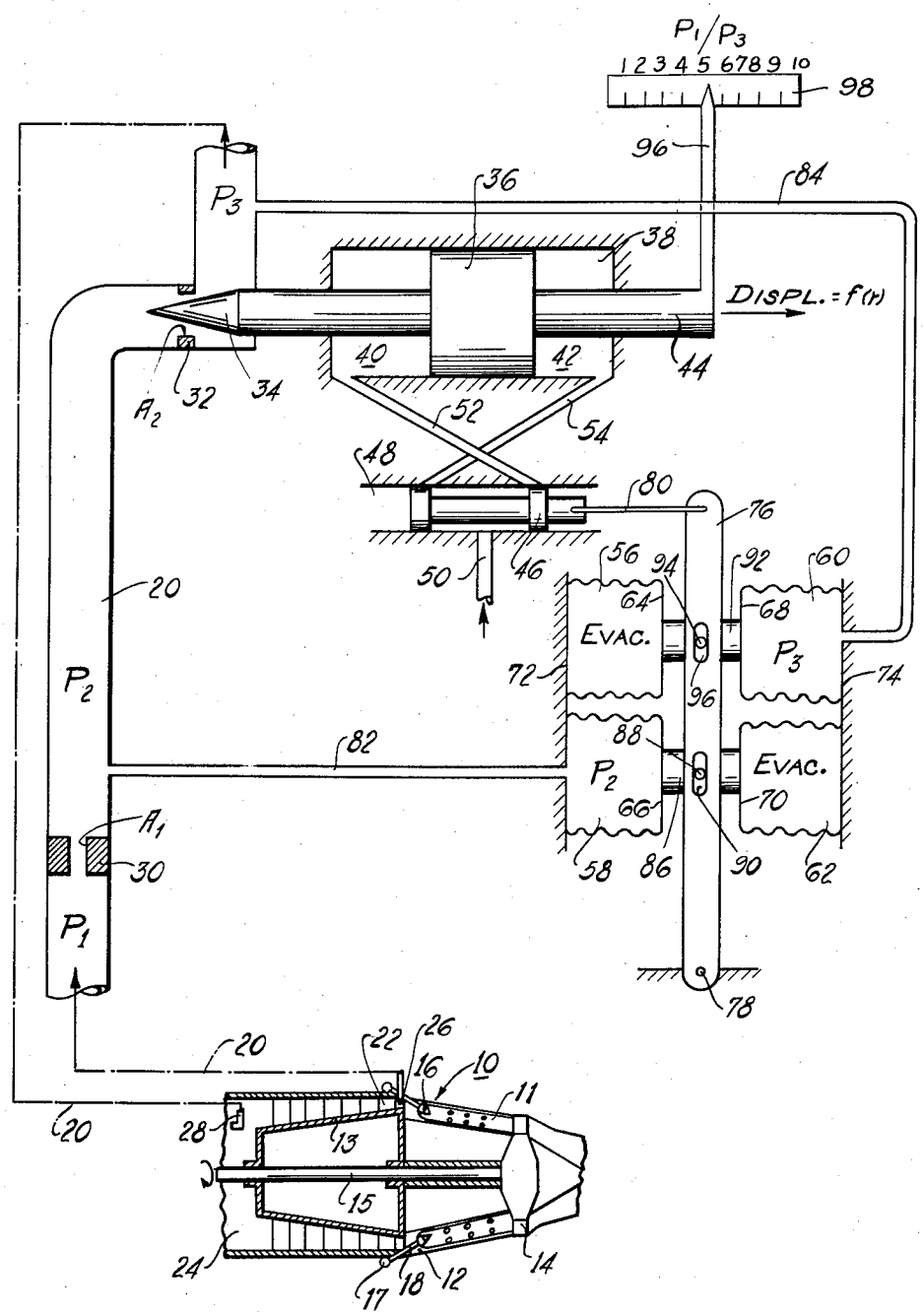

2,858,700
RATIOMETER

Robert G. Rose, South Bend, Ind., assignor to Bendix Aviation Corporation, South Bend, Ind., a corporation of Delaware Application October 15, 1953, Serial No. 386,362

8 Claims. (Cl. 73—407)

This invention relates to ratiometers and more particularly to a device for measuring the ratio of two pressures.

It is one of the principal objects of the present invention to provide a relatively simple device for effectively and continuously measuring the ratio of two pressures, either one or both of which pressures may vary across a relatively wide range.

Another object of this invention is to provide a device adapted to measure the ration of two gaseous pressures, which device includes two orifices in series and a member operatively associated with one of said orifices and displaceable as a predetermined function of a pressure ratio.

It is a further object of this invention to provide a pressure ratio measuring device which measures the ratio of pressures across a plurality of bleeds in series as a predetermined function of the ratio of the areas of said bleeds.

A further and more specific object of this invention is to provide a ratiometer wherein the ratio of pressures across two orifices in series is measured by a member adapted to control the effective area of one of said orifices, which member maintains a substantially constant pressure ratio across one of the said orifices.

Another object of this invention is to provide a device for continuously measuring the ratio of two variable pressures and for expressing or indicating a predetermined function of said ratio in terms of displacement of a member.

The foregoing and other objects and advantages will become apparent in view of the following description taken in conjunction with the drawing wherein a schematic representation of the device of the type specified is illustrated in combination with a mechanism which provides a source of variable pressure to said device, illustrated in schematic sectional view as a turbo-jet engine for aircraft.

Referring now to the drawing, a gas turbine engine is generally indicated at 10 which includes a series of combustion chambers 11, mounted in a casing having a header or air intake section 12. A dynamic compressor of the axial flow type is indicated at 13 and is adapted to be driven by means of a turbine 14 through its drive shaft 15. Each of the combustion chambers is provided with a burner nozzle 16, to which metered fuel is supplied under pressure by way of a fuel manifold 17 and individual fuel lines 18. The manifold 17 receives metered fuel from a fuel control device, not shown, which may meter fuel to said manifold as a function of the ratio of the pressures across the compressor and which may be controlled by the device which is the subject matter of this invention as hereinafter described. For example, my invention could be readily substituted for the compressor ratio sensing device which is illustrated and described in the copending application of Frank C. Mock, Serial No. 276,791, filed March 15, 1952 (common assignee), now Patent 2,657,233. It should be understood, however, that I do not limit myself to the control of a fuel valve or any other type of valve inasmuch as my invention may be utilized to control the movement or loading of any element or device such as a cam, lever, spring mechanism, or other control device which it is desired to control as a function of a variable pressure ratio. Furthermore, it is apparent that my invention may be utilized to measure the ratio of pressures across other types of pressure generating devices than the compressor of a gas turbine engine.

The pressure ratiometer, which is the subject matter of this invention, comprises a conduit 20, which is shown connected to a source of variable high pressure at the discharge side 22 of the compressor 13 at the one end thereof and to a source of variable and relatively low pressure at the inlet side 24 of the compressor at the opposite end thereof. The conduit 20 terminates at its high and low pressure ends respectively in total pressure pick-up passages 26 and 28. Disposed within said conduit is a calibrated fixed orifice or restriction 30 having an area $A_1$ and a variable orifice or restriction 32 having an effective area $A_2$ which is controlled by a contoured valve 34. The flow of fluid through the conduit enters the restriction 30 at compressor discharge pressure $P_1$ and enters the restriction 32 at a controlled pressure $P_2$, thence flowing to the total pressure pick-up passage 28 at a pressure substantially equal to compressor inlet pressure $P_3$. The valve 34 is controlled by a servo-motor member 36 reciprocably disposed in a cylinder 38. The member 36 forms chambers 40 and 42 on either side thereof and is operatively connected to an element or member to be controlled, not shown, by means of a rod or shaft 44. The position of the member 36 in the cylinder 38, and the corresponding area $A_2$ of restriction 32, is controlled by a servo or pilot valve 46 reciprocably disposed in an open ended cylinder 48 and adapted to control the supply of high pressure fluid to one or the other of chambers 40 and 42 from a pressurizing source, not shown, through conduit 50, cylinder 48 and conduit 52 or 54. That chamber which is not vented to high pressure fluid when valve 46 is in an off-neutral position is vented to a low presure source, not shown, through conduit 52 or 54 and the respective open end of cylinder 48.

A bank of bellows 56, 58, 60 and 62 having movable ends 64, 66, 68 and 70 respectively and anchored to the facing abutments 72 and 74, as shown, are conjointly operable to control the servo valve 46, and therefore servo motor 36 and valve 34, by means of suitable connections to a lever member 76 fulcrumed at 78, said lever member being connected to the servo valve by a stem or rod 80. All of said bellows may be disposed in a chamber, not shown, which is vented to the atmosphere, the bellows 56 and 62 being evacuated to cancel out the effect of changes in atmospheric pressure on the operation of bellows 58 and 60. Bellows 58 communicates with conduit 20 at $P_2$ pressure through a passage 82 and bellows 60 communicates with conduit 20 at pressure $P_3$ through a passage 84. Bellows 58 and 62 are connected to the lever 76 by means of a rigid member 86 and a pin 88 disposed in a slotted section 90 of said lever and bellows 56 and 60 are similarly connected to the lever 76 by means of a member 92 and the pin 94 which is disposed in a second slotted section 96 of said lever.

The valve 34 may be arranged to control the area of restriction 30 rather than that of restriction 32, as shown, or said valve may control any one of a group of restrictions parallel to restriction 30 or 32 with the same functional result, hereinafter described, so long as the bank of bellows ars vented substantially as illustrated. In addition, the dynamic response characteristic of the valve 34 may be improved by application of known servo-mechanism techniques to the servo-mechanism which controls said valve, as above described.

Operation

It has been found that with two orifices in series in a conduit which is vented at one end thereof to a source of variable high fluid pressure and at the opposite end thereof to a source of variable low fluid pressure, control of the ratio of fluid pressures across the second series orifice to a substantially constant value results in the ratio of pressures across both of said orifices, or the ratio of source pressures, being equal to and variable as a function of the ratio of the areas of said orifices only. Referring to the legend of the drawings, this relationship may be expressed in the following form:

$$\frac{P_1}{P_3} = f\frac{(A_2)}{(A_1)}$$

when $P_2/P_3$ equals a constant.

This relationship has been utilized in the design of the above described structure which continuously measures the ratio of the pressures $P_1$ and $P_3$, irrespective of variations in either $P_1$ or $P_3$, by controlling the area $A_2$ of restriction 32 in such a manner that $P_2/P_3$ is maintained constant at all times, whereby the displacement of servo motor member 36 and rod 44 becomes a predetermined function of $P_1/P_3$, which function may be varied as desired by varying the contour of the valve 34.

The bellows 58, as shown, has the same effective area as the bellows 60 and the controlled constant pressure ratio $P_2/P_3$ is proportional to the ratio of the moment arms of bellows 60 and bellows 58 about the fulcrum 78. The particular desired value of pressure ratio $P_2/P_3$ for any given installation is selectable and may, for example, be varied as desired by changing the ratio of said moment arms and/or the area ratio of the bellows 58 and 60.

If at any given pressure $P_3$ the engine 10 is accelerated, the rate of change of pressure $P_1$ will be a function of the rates of change of the existent pressure and temperature conditions in the inlet section 24 of the compressor 13, the rotational speed of the engine and fuel flow. During such an acceleration, pressure $P_2$ tends to increase but the bellows 58, which is responsive to any increment of change in pressure $P_2$, momentarily overcomes the bellows 60 and throws lever 76 out of equilibrium thereby moving servo valve 46 to the right which vents chamber 40 to the high pressure servo fluid in conduit 50 through the cylinder 48 and conduit 52 and which vents chamber 42 to low pressure servo fluid in the left open end of cylinder 48 through conduit 54, whereby servo motor member 36 moves rightwardly to increase area $A_2$ of restriction 32 thereby reducing pressure $P_2$ to re-establish equilibrium of the bank of bellows and to reset the servo valve 46 to neutral position. Whenever servo valve 46 is in a neutral position the position of member 36, valve 34 and rod 44 is fixed. If pressure $P_1$ should decrease for any reason, as during an engine deceleration, the reverse of the foregoing mode of operation would occur and a new and lesser ratio $A_2/A_1$ will have been established. Likewise, an increase or decrease in pressure $P_3$ will momentarily destroy the equilibrium of the system resulting in a resetting of valve 34 in such a manner that the pressure ratio $P_2/P_3$ is maintained constant. Furthermore, from the above it is apparent that any simultaneous change in pressures $P_1$ and $P_3$ in the same or opposite senses, results in an actuation and control of servo valve 46 which repositions valve 34 in such a manner that the pressure ratio $P_2/P_3$ is always maintained at a substantially constant and predetermined value.

It may therefore be seen that the pressure ratio $P_1/P_3$, being equal to a function of the area ratio $A_2/A_1$ whenever the pressure ratio $P_2/P_3$ is maintained constant, is a function of area $A_2$ inasmuch as area $A_1$ is fixed. Since area $A_2$ is controlled by valve 34 it is therefore apparent that the linear displacement of motor member 36 and rod or shaft 44 is an effective indication of a predetermined function of the pressure ratio $P_1/P_3$ and that therefore any control element operatively connected to the rod 44, such as a fuel valve of the control system, not shown, which meters fuel to the nozzles 16, will be displaced and will control said fuel flow as such a function of said pressure ratio. It may be desired to utilize the position of the rod 44 as an indication of the pressure ratio $P_1/P_3$ in which case the rod 44 may be connected to any suitable indicating means, such as the pointer 96 which is positioned relative to a scale 98 in accordance with movement of the rod 44. The particular desired function of the pressure ratio $P_1/P_3$ according to which the rod 44 is displaced may be varied as desired to meet, for example, the demands of engines having different requirements, by recontouring the valve 34. In other words, the selected contour of the valve 34 predetermines the particular function of the pressure ratio $P_1/P_3$ which is obtained and which is reflected in terms of displacement of control rod 44. For example, a relatively long taper on valve 34 would result in a relatively great amount of displacement of rod 44 for a given change in the pressure ratio $P_1/P_3$ as compared with the degree of displacement of said rod resulting from the use of a relatively short tapered valve.

Although only one embodiment of the invention has been illustrated and described it will be apparent to persons skilled in the art that various changes in form and relative arrangement of parts may be made to suit requirements.

I claim:

1. In a pressure control device having a fluid flow passage adapted to be connected between a first source of variable high pressure fluid and a second source of variable low pressure fluid, means disposed in said passage for continuously modulating a fluid pressure in said passage when fluid is flowing therethrough including a first orifice upstream of said modulated pressure, a second orifice downstream of said modulated pressure, a valve member operatively connected to said second orifice and actuated in response to variations in said modulated pressure, said valve member being controlled by said modulated pressure, at any given pressure value at one of said sources, in such a manner that the displacement thereof is a predetermined function of the ratio of the pressures across the first and second sources, and a servo mechanism for positioning said valve member including a null-seeking servo valve.

2. A pressure ratio measuring device comprising a conduit adapted to be connected to a first source of variable high fluid pressure and to a second source of variable low fluid pressure, a first flow restriction in said conduit, having a constant effective flow area, a second flow restriction in said conduit in series with and downstream from said first restriction, and means operatively connected to said second flow restriction for controlling the pressure intermediate said first and second restrictions including mechanism responsive to said intermediate pressure for controlling the pressure ratio across said second restriction and valve means controlled by said mechanism in such a manner that the amount of linear displacement of said valve means is always a predetermined function of the ratio of pressures across said first and second sources irrespective of variations in the fluid pressure at said first and/or second sources, and means operatively connected to and actuated by said valve means for indicating the value of said measured pressure ratio, said mechanism including a null-seeking servo valve for controlling the position of said valve means.

3. A pressure control device comprising a conduit adapted to be connected to first and second sources of fluid pressure, a calibrated fixed area orifice in said conduit between said first and second sources of fluid pressure, a flow restriction in said conduit between said first and second sources of fluid pressure in series with said calibrated fixed area orifice, flow regulating means associated with and downstream from said restriction, a pressure responsive member communicating with said conduit upstream of said restriction, another pressure responsive member communicating with said conduit downstream of said restriction, and null-seeking servo means operatively connecting both of said pressure responsive members to said flow regulating means in such a manner that said flow regulating means controls the ratio of the pressures sensed by said pressure responsive members and the position of said flow regulating means is always a function of the ratio of pressures across said first and second sources.

4. In a pressure ratio measuring device having a fluid flow passage connected between first and second sources of fluid pressure, first and second orifices in said passage in series flow relationship, said first orifice being upstream from said second orifice and having a predetermined fixed effective flow area, and means for measuring a function of the ratio of the pressures at said first and second sources of fluid pressure including valve means for controlling the effective area of said second orifice, servo motor means connected to said valve means for controlling the position thereof, null-seeking servo valve means operatively connected to said servo motor means for controlling the position thereof, pressure responsive means connected to said fluid flow passage on either side of said second orifice, said pressure responsive means being operatively connected to said servo valve means in such a manner that said valve means controls the effective area of said second orifice to maintain a predetermined constant pressure ratio of the pressures thereacross, whereby the displacement of said valve means follows a predetermined function of the ratio of pressures at said first and second sources of fluid pressure and pressure ratio indicating means operatively connected to and actuated by said valve means.

5. For use with a gas turbine power plant having an air compressor system, said system having a low pressure intake source and a high pressure discharge source, a pressure control device comprising a fluid flow passage connected between said low pressure and said high pressure sources, a first orifice in said passage, a second orifice in said passage downstream from said first orifice, movable valve means for controlling the effective area of said second orifice, pressure responsive means communicating with said passage on opposite sides of said second orifice, and servo mechanism operatively connected between said pressure responsive means and said movable valve means, said servo mechanism normally being biased to a null position, said movable valve means being positionally controlled by said pressure responsive means in such a manner that the area ratio of said restriction follows a predetermined function of the pressure ratio across said air compressor irrespective of variations in pressure at said low pressure intake source and/or said high pressure discharge source.

6. For use with a gas turbine power plant having an air compressor system, said system having a low pressure intake source and a high pressure discharge source, a pressure control device comprising a passage connected between said low pressure intake source and high pressure discharge source, a first orifice in said passage, a second orifice in said passage downstream from said first orifice, movable valve means for controlling the effective area of said second orifice, a first pressure responsive member communicating with said passage on one side of said second restriction, a second pressure responsive member communicating with said passage on another side of said second restriction, a first evacuated bellows member connected to said first pressure responsive member, second evacuated bellows member connected to said second pressure responsive member, said first and second evacuated bellows members acting to oppose movement of said first and second pressure responsive member respectively, null-seeking servo mechanism means operatively connected to said movable valve means controlling the position of said movable valve means in said orifice, and lever means operatively connected between said first and second pressure responsive members and said first and second evacuated bellows members and said servo mechanism means, said movable valve means being controlled by said pressure responsive means in such a manner that the displacement of said movable valve means is a predetermined function of the pressure ratio across said first and second sources.

7. For use with a gas turbine power plant having an air compressor system, first and second pressure sources associated with said system, a ratiometer comprising a fluid flow passage connected between said first and second pressure sources, a first flow restriction in said passage, a second flow restriction in said passage downstream from said first flow restriction and in series flow therewith, valve means for controlling the effective area of said second restriction, pressure responsive means communicating with said flow passage on opposite sides of said valve means, and null-seeking servo mechanism means operatively connected between said pressure responsive means and said valve means, said valve means being positionally controlled by said pressure responsive means in such a manner that the area ratio of said first and second flow restrictions follows a predetermined function of the pressure ratio across the first and second pressure sources irrespective of variations at said first and/or second source.

8. For use with a gas turbine power plant having an air compressor system, first and second pressure sources associated with said system, a ratiometer comprising a fluid flow passage connected between said first and second pressure sources, a first flow restriction in said passage, a second flow restriction in said passage downstream from said first flow restriction, valve means for controlling the effective area of said second restriction, pressure responsive means communicating with said flow passage on opposite sides of said valve means, and null-seeking servo mechanism means operatively connected between said pressure responsive means and said valve means, said valve means being controlled by said pressure responsive means in such a manner that the displacement of said movable valve means is a predetermined function of the pressure ratio across said first and second sources.

References Cited in the file of this patent

UNITED STATES PATENTS

| | | |
|---|---|---|
| 1,249,601 | De Ferranti | Dec. 11, 1917 |
| 2,116,550 | Adelson | May 10, 1938 |
| 2,411,287 | Mock | Nov. 19, 1946 |
| 2,454,588 | Baak | Nov. 23, 1948 |
| 2,468,416 | Stresen-Reuter | Apr. 26, 1949 |
| 2,645,240 | Drake | July 14, 1953 |
| 2,652,813 | Stresen-Reuter et al. | Sept. 22, 1953 |